(12) United States Patent
Yoneda

(10) Patent No.: US 12,469,913 B2
(45) Date of Patent: Nov. 11, 2025

(54) SECONDARY BATTERY

(71) Applicant: PRIME PLANET ENERGY & SOLUTIONS, INC., Tokyo (JP)

(72) Inventor: Koshiro Yoneda, Ichinomiya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 616 days.

(21) Appl. No.: 18/046,273

(22) Filed: Oct. 13, 2022

(65) Prior Publication Data

US 2023/0126089 A1    Apr. 27, 2023

(30) Foreign Application Priority Data

Oct. 22, 2021 (JP) .................................. 2021-172985

(51) Int. Cl.
*H01M 50/188* (2021.01)
*H01M 50/15* (2021.01)
*H01M 50/543* (2021.01)
*H01M 50/552* (2021.01)

(52) U.S. Cl.
CPC ......... *H01M 50/188* (2021.01); *H01M 50/15* (2021.01); *H01M 50/543* (2021.01); *H01M 50/552* (2021.01)

(58) Field of Classification Search
CPC .. H01M 50/15; H01M 50/188; H01M 50/552; H01M 50/553
See application file for complete search history.

(56) References Cited

U.S. PATENT DOCUMENTS

| 2005/0095502 A1 | 5/2005 | Sugimune et al. |
| 2015/0318519 A1 | 11/2015 | Tsutsumi et al. |
| 2017/0214030 A1 | 7/2017 | Tsutsumi et al. |
| 2021/0036299 A1 | 2/2021 | Maeda et al. |

FOREIGN PATENT DOCUMENTS

| DE | 102017200823 A1 | 7/2017 |
| DE | 112019000626 T5 | 10/2020 |
| JP | 2005-129488 A | 5/2005 |
| JP | 2008-192552 A | 8/2008 |
| JP | 2008-270167 A | 11/2008 |
| JP | 2015-164102 A | 9/2015 |
| JP | 2016-134333 A | 7/2016 |
| JP | 2017-130386 A | 7/2017 |
| JP | 2019-179664 A | 10/2019 |
| KR | 10-2019-0104687 A | 9/2019 |
| WO | WO 2014/103874 A1 | 7/2014 |
| WO | WO 2019/151359 A1 | 8/2019 |

*Primary Examiner* — Kevin E Yoon
(74) *Attorney, Agent, or Firm* — Finnegan, Henderson, Farabow, Garrett and Dunner, LLP

(57) ABSTRACT

A secondary battery disclosed here includes; an electrode body; a battery case including a case body and a lid; an external terminal; and a gasket insulates the lid and the external terminal at an outer side of the battery case. The lid has an attachment hole to which the external terminal is attached. The external terminal includes a shaft inserted in the attachment hole and a head extending radially outward from one end of the shaft. The gasket includes a bearing portion disposed between a bottom surface of the head and the lid, and a side wall rising upward from the bearing portion. The head has a chamfered portion in which at least a part of as outer periphery of the bottom surface. A gap is formed between the chamfered portion and each of the bearing portion and the side wall.

5 Claims, 6 Drawing Sheets

SECONDARY BATTERY

CROSS REFERENCE TO RELATED APPLICATIONS

This application claims the benefit of priority to Japanese Patent Application No. 2021-172985 filed on Oct. 22, 2021. The entire contents of this application are hereby incorporated herein by reference.

BACKGROUND

The present disclosure relates to a secondary battery.

JP2008-270167A discloses a sealed battery including an electrode external terminal having a flange and a columnar insertion portion, an insulating gasket, and a sealing plate. In the sealed battery disclosed in JP2008-270167A, the columnar insertion portion of the electrode external terminal has a non-complete circular shape in cross section. This configuration is intended to hinder rotation of the columnar insertion portion so that liquid leakage caused by rotation of the electrode external terminal is less likely to occur.

JP2008-192552A discloses an electrode including: a metal rivet extending from the inside of a battery case, swaged in an outer portion so that a front end thereof is enlarged, and serving as a conduction part; and a metal terminal having a portion with a through hole and fixed to the battery case by inserting the rivet through the through hole. The electrode is isolated from a lid by an insulator. In the electrode disclosed in JP2008-192552A, at least a portion of the through hole of the metal terminal near the front end of the rivet is tapered to gradually enlarge toward the front end of the rivet. This configuration is intended to reduce stress concentration at the rivet front end to which the electrode is fixed.

SUMMARY

The outer terminal exposed at the outer side of the battery case can be attached to the lid of the battery case with a gasket interposed therebetween. The gasket has a sealing function for retaining hermeticity of the inside of the battery case and an insulating function for insulation between the external terminal and the lid. For example, in a case where the gasket is subjected to high voltage, high temperature, and high pressure, the gasket might be damaged to impair the sealing function, the insulating function, and other functions. Inventor of the present disclosure proposes a configuration of a secondary battery that suppresses damage of a gasket.

A secondary battery disclosed here includes: an electrode body; a battery case including a case body having an opening, and a lid configured to close the opening of the case body; an external terminal electrically connected to the electrode body and exposed at an outer side of the battery case; and a gasket configured to insulate the lid and the external terminal from each other at the outer side of the battery case. The lid has an attachment hole to which the external terminal is attached. The external terminal includes a shaft inserted in the attachment hole and a head disposed at the outer side of the battery case and extending radially outward from one end of the shaft. The gasket includes a bearing portion and a side wall, the bearing portion being disposed between a bottom surface of the head and the lid, the side wall rising upward from the bearing portion. The head of the external terminal has a chamfered portion in which at least a part of an outer periphery of the bottom surface. A gap is formed between the chamfered portion and each of the bearing portion and the side wall. This configuration can reduce damage of the gasket.

The chamfered portion may have a C-face shape or an R-face shape. The gasket may have a portion in which a thickness of the bearing portion is compressed at a compressibility of 50% or more on a surface of the gasket in contact with the bottom surface of the head. The chamfered portion may be continuous in a circumferential direction of the head. The lid may be rectangular. The chamfered portion may be disposed along a long-side direction of the lid. The side wall of the gasket may have a portion at a distance of 1.8 mm or less from a peripheral portion of the lid.

DETAILED DESCRIPTION

Figure 1:
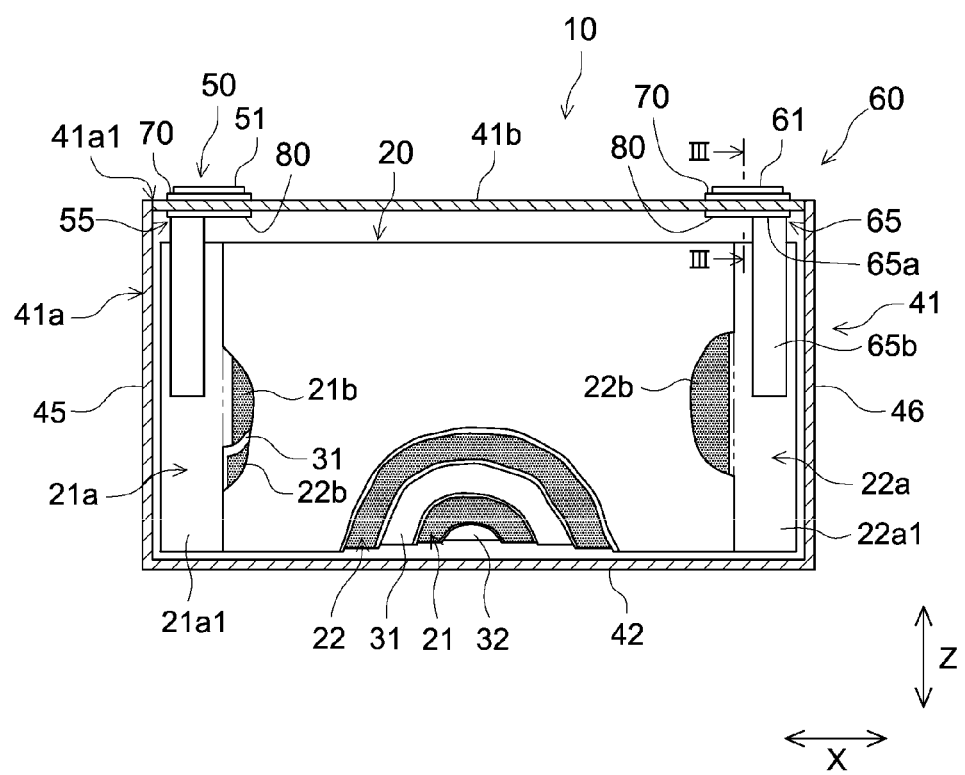
FIG. 1 is a partial cross-sectional view of a lithium ion secondary battery 10.

One embodiment of a secondary battery disclosed here will be described hereinafter. An embodiment described here is, of course, not intended to particularly limit the present disclosure. Each of the drawings is schematically drawn and does not necessarily reflect an actual object. An expression such as "A to B" indicating a numerical range means "A or more and B or less" unless otherwise specified. In the drawings to be described below, members and parts having the same functions are denoted by the same reference characters, and description thereof will not be repeated or will be simplified. In the drawings referred to herein, character X denotes a "long-side direction," character Y denotes a "short-side direction," and character Z denotes a "height direction."

A "secondary battery" herein generally refers to a power storage device in which charge/discharge reaction occurs by movement of charge carriers between a pair of electrodes (positive and negative electrodes) through an electrolyte. The secondary battery herein includes, for example, a capacitor such as an electric double layer capacitor as well as a so-called storage battery such as a lithium ion secondary battery, a nickel-metal hydride battery, and a nickel-cadmium battery. The following description is directed to an embodiment of a lithium ion secondary battery among the secondary batteries described above.

Lithium Ion Secondary Battery 10

Figure 2:
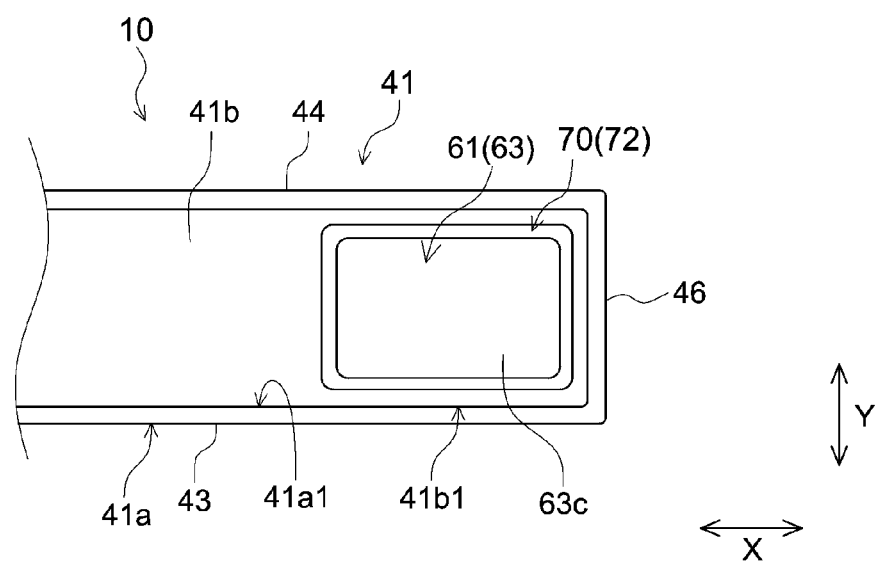
FIG. 2 is a plan view illustrating a positional relationship between a lid 41b and an external terminal 61.

FIG. 1 is a partial cross-sectional view of a lithium ion secondary battery 10 (hereinafter referred to simply as a secondary battery 10). FIG. 1 illustrates a state where the inside of a substantially rectangular parallelepiped battery case 41 is exposed along a wide face at one side. The secondary battery 10 illustrated in FIG. 1 is a so-called sealed battery. FIG. 2 is a plan view illustrating a lid 41b and an external terminal 61. As illustrated in FIG. 1, the lithium ion secondary battery 10 includes: an electrode body 20; a battery case 41 including a case body 41a having an opening 41a1 and a lid 41b for closing the opening 41a1 of the case body 41a; the external terminal 61 electrically connected to the electrode body 20 and exposed at the outside of the battery case 41, and a gasket 70 for insulating the lid 41b and the external terminal 61 from each other at the outside of the battery case 41.

Electrode Body 20

The electrode body 20 is housed in the battery case 41 while being covered with, for example, an insulating film (not shown). The electrode body 20 includes a positive electrode sheet 21 as a positive electrode element, a negative electrode sheet 22 as a negative electrode element, and separator sheets 31 and 32 as separators. The positive electrode sheet 21, the first separator sheet 31, the negative electrode sheet 22, and the second separator sheet 32 are long band-shaped members.

The positive electrode sheet 21 includes a positive electrode current collector foil 21a (e.g., aluminium foil) having a predetermined width and a predetermined thickness, and a positive electrode active material layer 21b including a positive electrode active material is disposed on each surface of the positive electrode current collector foil 21a except for a non-formed portion 21a1 having a uniform width at one end on one side in the width direction (long-side direction X). The positive electrode active material can release lithium ions during charging and absorb lithium ions during discharging in a manner similar to a lithium transition metal composite material in, for example, a lithium ion secondary battery. Various materials have been generally proposed for the positive electrode active material, as well as a lithium transition metal composite material, and the positive electrode active material is not limited to a specific material.

The negative electrode sheet 22 includes a negative electrode current collector foil 22a (copper foil in this embodiment) having a predetermined width and a predetermined thickness, and a negative electrode active material layer 22b including a negative electrode active material is disposed on each surface of the negative electrode current collector foil 22a except for a non-formed portion 22a1 having a uniform width at an edge on one side in the width direction. The negative electrode active material can store lithium ions during charging and release, during discharging, lithium ions stored during charging in a manner similar to natural graphite in, for example, a lithium ion secondary battery. Various materials have been generally proposed for the negative electrode active material as well as natural graphite, and the negative electrode active material is not limited to a specific material.

The separator sheets 31 and 32 are, for example, porous resin sheets through which an electrolyte having required heat resistance can pass. Various materials have also been proposed for the separator sheets 31 and 32, and the separator sheets 31 and 32 are not limited to a specific material.

In this embodiment, the width of the negative electrode active material layer 22b is larger than the positive electrode active material layer 21b, for example. The width of each of the separator sheets 31 and 32 is larger than the negative electrode active material layer 22b. The non-formed portion 21a1 of the positive electrode current. collector foil 21a and the non-formed portion 22a1 of the negative electrode current collector foil 22a are disposed at opposite sides in the width direction. The positive electrode sheet 21, the first separator sheet 31, the negative electrode sheet 22, and the second separator sheet 32 are oriented in the same direction along the length direction, and are sequentially stacked and wound together. The negative electrode active material layer 22b covers the positive electrode active material layer 21b with the separator sheets 31 and 32 interposed therebetween. The negative electrode active material layer 22b is covered with the separator sheets 31 and 32. The non-formed portion 21a1 of the positive electrode current collector foil 21a extends off from one side, in the width direction, of each of the separator sheets 31 and 32. The non-formed portion 22a1 of the negative electrode current collector foil 22a extends off from the separator sheets 31 and 32 at the opposite side in the width direction.

As illustrated in FIG. 1, the electrode body 20 described above is in a flat state along one flat surface including a winding axis so as to be housed in the case body 41a of the battery case 41. The non-formed portion 21a1 of the positive electrode current collector foil 21a is disposed along one side of the winding axis of the electrode body 20, and the non-formed portion 22a1 of the negative electrode current collector foil 22a is disposed along the opposite side of the winding axis of the electrode body 20.

Battery Case 41

The battery case 41 houses the electrode body 20. The battery case 41 includes the case body 41a having a substantially rectangular parallelepiped shape whose one side surface has an opening, and the lid 41b attached to the opening 41a1. In this embodiment, from the viewpoint of obtaining weight reduction and required stiffness, each of the case body 41a and the lid 41b is made of aluminium or an aluminium alloy mainly containing aluminium. Although the embodiment illustrated in FIG. 1 employs the wound-type electrode body 20 as an example, the structure of the electrode body 20 is riot limited to this type. The structure of the electrode body 20 may be a stacked structure in which positive electrode sheets and negative electrode sheets are alternately stacked with separator sheets interposed therebetween. A plurality of electrode bodies 20 may be housed in the battery case 41.

The battery case 41 may house an unillustrated electrolyte together with the electrode body 20. As the electrolyte, a nonaqueous electrolyte in which a supporting electrolyte is dissolved in a nonaqueous electrolyte. Examples of the non-aqueous solvent include carbonate-based solvents such as ethylene carbonate, dimethyl carbonate, and ethyl methyl carbonate. Examples of the supporting electrolyte include fluorine-containing lithium salt such as $LiPF_6$.

Case Body 41a

The case body 41a has a substantially rectangular parallelepiped shape whose one side surface has an opening. The case body 41a includes a substantially rectangular bottom surface 42, a pair of wide faces 43 and 44 (see FIG. 2), and a pair of narrow faces 45 and 46. Each of the pair of wide faces 43 and 44 rises from a long side of the bottom surface 42. Each of the pair of narrow faces 45 and 46 rises from a short side of the bottom surface 42. One side surface of the case body 41a has the opening 41a1 surrounded by the pair of wide faces 43 and 44 and the pair of narrow faces 45 and 46.

Lid 41b

The lid 41b seals the opening 41a1 of the case body 41a. In this embodiment, the lid 41b is rectangular in plan view. The lid 41b is provided with a positive electrode terminal 50 and a negative electrode terminal 60. The positive electrode terminal 50 includes an external terminal 51 and an internal terminal 55. The negative electrode terminal 60 includes an external terminal 61 and an internal terminal 65. Each of the internal terminals 55 and 65 is attached to the inner side of the lid 41b with an insulator 80 interposed therebetween. Each of the external terminals 51 and 61 is attached to the outer side of the lid 41b with the gasket 70 interposed therebetween. Each of the internal terminals 55 and 65 extends inside the case body 41a. The non-formed portion 21a1 of the positive electrode current collector foil 21a of the electrode body 20 and the non-formed portion 22a1 of the negative electrode current collector foil 22a are attached to the internal terminals 55 and 65 respectively attached to both side portions of the lid 41b in the long-side direction.

Each of the internal terminals 55 and 65 is made of a metal. From the viewpoint of enhancing joint strength with the positive electrode current collector foil 21a, aluminium or an aluminium alloy, for example, can be used for the internal terminal 55 of the positive electrode. From the viewpoint of enhancing joint strength with the negative electrode current collector foil 22a, copper or a copper alloy, for example, can be used for the internal terminal 65 of the negative electrode.

Each of the external terminals 51 and 61 is made of a metal. Metals for use as the external terminals 51 and 61 are selected as appropriate depending on, for example, the type of an external connection member such as a bus bar. Examples of the metals for the external terminals 51 and 61 include aluminium, an aluminium alloy, copper, and a copper alloy. Each of the external terminals 51 and 61 may be formed by joining a plurality of metals by dissimilar metal joint, for example.

Figure 3:
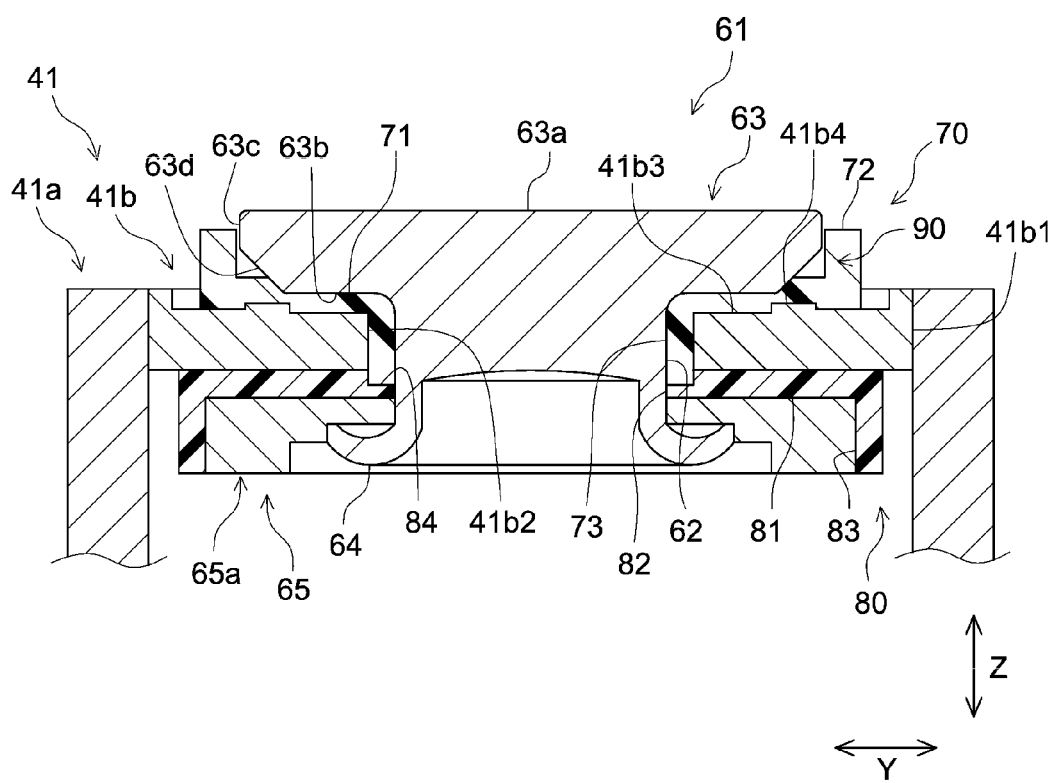
FIG. 3 is a cross-sectional view taken along line III-III in FIG. 1.

FIG. 3 is a cross-sectional view taken along line III-III in FIG. 1. FIG. 3 shows a cross section of a portion in which the negative electrode terminal 60 is attached to the lid 41b. A portion in which the positive electrode terminal 50 is attached to the lid 41b has a similar structure, and thus, will not be described. As illustrated in FIG. 3, the lid 41b has an attachment hole 41b2 to which the external terminal 61 is attached. The attachment hole 41b2 penetrates the lid 41b at a predetermined position of the lid 41b. The internal terminal 65 and the external terminal 61 are attached to the attachment hole 41b2 of the lid 41b with the gasket 70 and the insulator 80 interposed therebetween. A bearing surface 41b3 to which the gasket 70 is mounted is provided around the attachment hole 41b2 at the outer side of the attachment hole 41b2. The bearing surface 41b3 has a projection 41b4 for positioning the gasket 70. The projection 41b4 is disposed at a predetermined position and is continuous circumferentially to surround the attachment hole 41b2.

External Terminal 61

The external terminal 61 includes a shaft 62 inserted in the attachment hole 41b2 and a head 63 disposed outside the battery case 41 and extending radially outward from one end of the shaft 62. The head 63 is a substantially flat-plate portion whose cross section parallel to the lid 41b is larger than the opening area of the attachment hole 41b2. The head 63 is substantially rectangular in plan view (see FIG. 2). The head 63 is to be connected to a bus bar. The bus bar can be connected to an upper surface 63a of the head 63 by welding, for example. The shaft 62 can be attached to the attachment hole 41b2 with the gasket 70 interposed therebetween. The shaft 62 projects downward from a substantially center portion of the head 63.

The external terminal 61 includes a swaging strip 64. The swaging strip 64 is to be swaged on the internal terminal 65 inside the lid 41b. The swaging strip 64 extends from the shaft 62, is inserted in the lid 41b, and then is bent to be swaged on the internal terminal 65 of the negative electrode.

The gasket 70 described later is disposed between a bottom surface 63b of the head 63 of the external terminal 61 and the lid 41b. A side peripheral surface 63c of the head 63 of the external terminal 61 is surrounded by a side wall 72 of the gasket 70 while being partially exposed upward.

The head 63 of the external terminal 61 has a chamfered portion 63d in at least a part of the outer periphery of the bottom surface 63b. The chamfered portion 63d is formed at a corner between the bottom surface 63b and the side peripheral surface 63c. A part of the chamfered portion 63d including the boundary between the chamfered portion 63d and the bottom surface 63b is in contact with the gasket 70. In this embodiment, the chamfered portion 63d has a C-face shape with an angle of 45 degrees. In this embodiment, the upper end of the chamfered portion 63d is located at a position at which the thickness from the bottom surface 63b of the head 63 is about 50%. The chamfered portion 63d is continuous in the circumferential direction of the head 63.

Gasket 70

The gasket 70 is attached o the attachment hole 41b2 and the bearing surface 41b3 of the lid 41b. The gasket 70 is disposed between the lid 41b and the external terminal 61 and establishes insulation between the lid 41b and the external terminal 61. The gasket 70 is attached to the attachment hole 41b2 of the lid 41b while being compressed to make the battery case 41 hermetic. In this embodiment, the gasket 70 includes a bearing portion 71 being disposed between the bottom surface 63b of the head 63 and the lid 41b, and the side wall 72 rising upward from the bearing portion 71. The gasket 70 also includes a boss portion 73 projecting from the bottom surface of the bearing portion 71.

The bearing portion 71 is mounted to the bearing surface 41b3 provided on the outer surface around the attachment hole 41b2 of the lid 41b. In plan view, the bearing portion 71 has an outer size slightly larger than the head 63. The bearing portion 71 has a substantially flat surface in conformity with the bearing surface 41b3. The bearing portion 71 is partially compressed by the bottom surface 63b of the head 63 of the external terminal 61, the bearing surface 41b3, and the projection 41b4. The bearing portion 71 of the gasket 70 is preferably compressed to such a degree that the battery case 41 is hermetically sealed. In this respect, the gasket 70 may have a portion in which the thickness of the bearing portion 71 is compressed at a compressibility of 40% or more on a surface of the gasket 70 in contact with the bottom surface 63b of the head 63, and preferably has a portion in which the thickness is compressed at a compressibility of 50% or more. The compressibility of the bearing portion 71 is preferably set at such a degree that the gasket 70 is not damaged. In a portion of the bearing portion 71 that is compressed most, for example, the compressibility may be 70% or less and is preferably 60% or less.

The compressibility of the bearing portion 71 of the gasket 70 herein refers to a proportion of the thickness of the compressed bearing portion 71 to the thickness of the non-compressed bearing portion 71. The compressibility of the bearing portion 71 can be obtained by comparing a compressed portion of the bearing portion 71 with a non-compressed portion of the bearing portion 71.

The side wall 72 rises upward from a peripheral portion of the bearing portion 71. The side wall 72 is continuous in the circumferential direction of the peripheral portion of the bearing portion 71. The side wall 72 surrounds the side peripheral surface 63c of the head 63 of the external terminal 61. The height of the side wall 72 is not specifically limited, and in this embodiment, is set such that the upper end of the side wall 72 is lower than the upper surface 63a of the head 63.

The boss portion 73 has an outer shape along the inner side surface of the attachment hole 41b2 to be attached to the attachment hole 41b2 of the lid 41b. The inner side surface of the boss portion 73 serves as a mounting hole to which the shaft 62 of the external terminal 61 is mounted.

As the gasket 70, a material having high chemical resistance and high weather resistance is preferably used. In this embodiment, tetrafluoroethylene perfluoroalkyl vinyl ether copolymer (PFA) is used as the gasket 70. A material for the gasket 70 is not limited to PFA. Polypropylene (PP), polyethylene (PE), or polyphenylene sulfide (PPS) resin, for example, may be used as the gasket 70.

Insulator 80

The insulator 80 is mounted to the inner side of the lid 41b around the attachment hole 41b2 of the lid 41b. The insulator 80 includes a base 81, a hole 82, and a side wall 83. The base 81 is disposed along the inner surface of the lid 41b. In this embodiment, the base 81 has a substantially flat-plate portion. The base 81 is disposed along the inner surface of the lid 41b, and has a size with which the base 72a can be housed in the case body 41a and does not extend out of the lid 41b. The hole 82 is provided in conformity with the inner surface of the boss 73 of the gasket 70. In this embodiment, the hole 82 is disposed in a substantially center portion of the base 81. A side surface facing the inner surface of the lid 41b has a step that is recessed around the hole 82. The step houses a front end of the boss portion 73 of the gasket 70 mounted to the attachment hole 41b2. The side wall 83 extends downward from the peripheral portion of the base 81. The base 81 houses a proximal portion 65a at one end of the internal terminal 65. Since the insulator 80 is disposed inside the battery case 41, the insulator 80 preferably has required chemical resistance. In this embodiment, polyphenylene sulfide (PPS) resin is used for the insulator 80. A material for the insulator 80 is not limited to PPS.

The internal terminal 65 includes the proximal portion 65a and a connection strip 65b (see FIG. 1). The proximal portion 65a is mounted to the base 81 of the insulator 80. In this embodiment, the proximal portion 65a has a shape in conformity with the inner side of the side wall 83 around the base 81 of the insulator 80. The connection strip 65b extends from one end of the proximal portion 65a, and extends inside the case body 41a to be connected to the non-formed portion 22a1 of the negative electrode of the electrode body 20 (see FIG. 1).

In fabrication of the secondary battery 10, the positive electrode terminal 50 and the negative electrode terminal 60 are attached to the lid 41b with the gasket 70 and the insulator 80 attached. Next, the electrode body 20 is attached to the positive electrode terminal 50 and the negative electrode terminal 60. Thereafter, the lid 41b is mounted to the opening 41a1 of the case body 41a (see FIG. 1) surrounded by the long sides of the pair of wide faces 43 and 44 (see FIG. 2) and the short sides of the pair of narrow faces 45 and 46. A peripheral portion 41b1 of the lid 41b is then joined to the edge of the opening 41a1 of the case body 41a. This joint may be performed by, for example, continuous welding without a gap. This welding may be, for example, laser welding.

The secondary battery can have dimensional limitations. For example, the size of a secondary battery for use in a vehicle is preferably reduced from the viewpoints of enhancing fuel efficiency of the vehicle, reducing the weight, and obtaining cabin space. Since a liquid inlet for an electrolyte, a safety valve, and other components can be provided in a center portion of the lid of the secondary battery and the amount of an active material disposed on a current collector foil is increased in order to increase a battery capacity, for example, an external terminal can be disposed at an outer side as much as possible in the long side direction of the lid. Accordingly, the gasket between the lid and the external terminal can be disposed at the outer side in the long-side direction of the lid. In addition, from the viewpoint of enhancing fuel efficiency of the vehicle, the size of the external terminal where a large current can flow (e.g., an upper surface of the external terminal connected to a bus bar) is preferably increased. When the size of the external terminal is increased, the size of the gasket between the external terminal and the lid can increase.

The inventor of the present disclosure found that the risk of damage of the gasket increases when the gasket is disposed at the outer side in the long-side direction of the lid or the size of the gasket is increased. For example, in the embodiment illustrated in FIG. 2, from the viewpoint described above, the external terminal 61 is preferably disposed at the outer side as much as possible (at the right side in a direction X in the drawing), and the area of the external terminal 61 is preferably large. For this reason, the gasket 70 can be disposed near the peripheral portion 41b1 of the lid 41b. As described above, in fabrication of the secondary battery, the peripheral portion of the lid is welded to the case body by laser welding. In this welding, if the gasket is disposed close to the peripheral portion of the lid, the gasket might be damaged by laser light or reflected light of laser light reflected on the lid or the case body.

Figure 4:
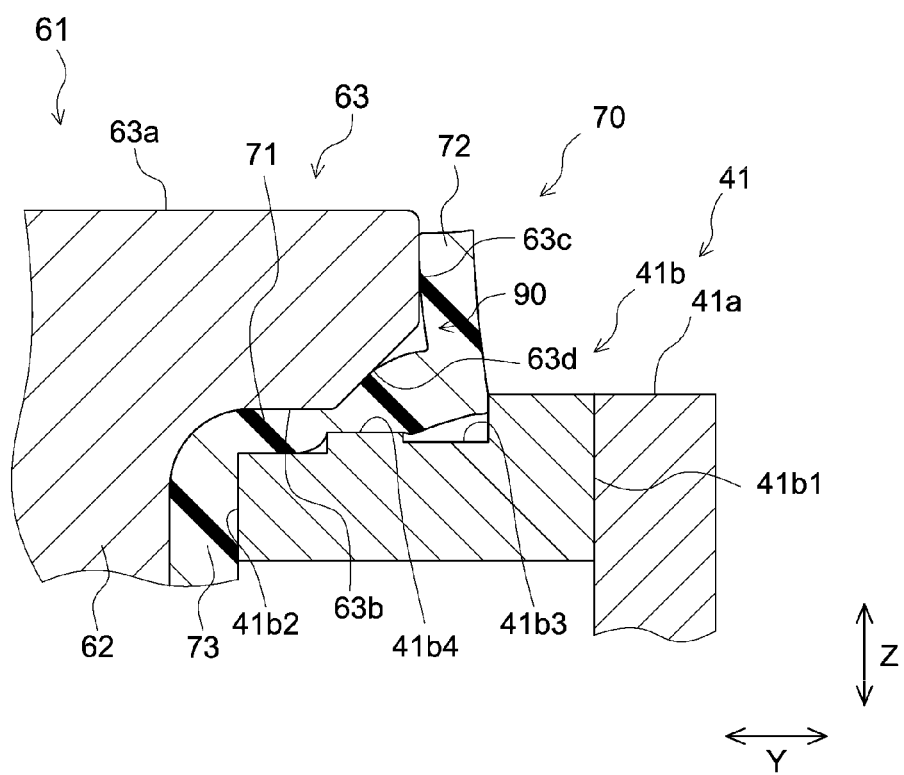
FIG. 4 is a cross-sectional view schematically illustrating shapes of a head 63 of the external terminal 61 and a gasket 70.
Figure 5:
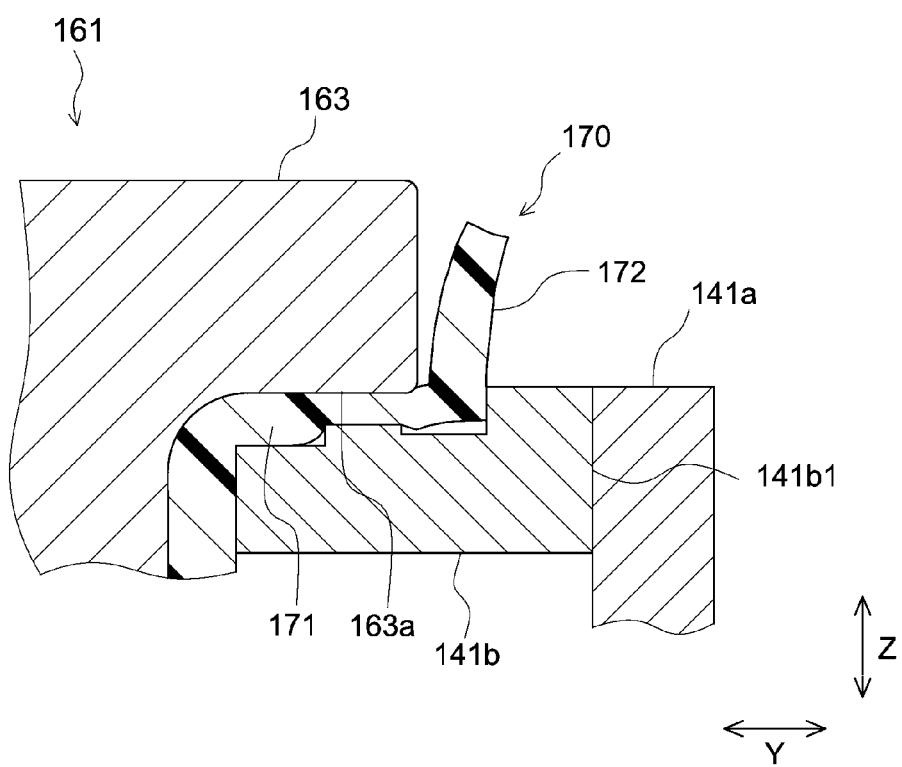
FIG. 5 is a cross-sectional view schematically illustrating shapes of an external terminal 161 having no chamfered portions and a gasket 170.

FIG. 4 is a cross-sectional view schematically illustrating shapes of the head 63 of the external terminal 61 and the gasket 70. FIG. 4 shows cross sections of the external terminal 61 and the gasket 70 taken along a short-side direction Y of the lid 41b. FIG. 4 shows the gasket 70 that is compressed and deformed by sandwiching the gasket 70 between the head 63 of the external terminal 61 and the lid 41b. FIG. 5 is a cross-sectional view schematically illustrating shapes of an external terminal 161 having no chamfered portions and a gasket 170. In a manner similar to FIG. 4, FIG. 5 shows the gasket 170 that is compressed and deformed by sandwiching the gasket 170 between a head 163 of the external terminal 161 and a lid 141b.

As illustrated in FIG. 5, the external terminal 161 having no chamfered portion has a large area in which a bottom surface 163a of the head 163 and a bearing portion 171 of the gasket 170 are in contact with each other. In this case, a large force is needed for increasing compressibility, for example, strengthening swaging between the internal terminal and the external terminal 161. A trial of the inventor of the present disclosure shows that when the gasket 170 tends to be deformed. toward the outside (to the right in a direction Y in the drawing) when being compressed under a large force. For example, when the bearing portion 171 of the gasket 170 is strongly compressed, a side wall 172 is tilted outward in some cases. When the side wall 172 is tilted outward to be close to a peripheral portion 141b1 of the lid 141b, laser light might damage the side wall 172 of the gasket 170 in welding the lid 141b to a case body 141a. In addition, reflected light of laser light reflected on a battery case 141 might damage the side wall 172 of the gasket 170. The compression of the bearing portion 171 of the gasket 170 under a large force can increase deformation of the gasket 170 so that dimensional accuracy might be unstable. In such a case, the gasket 170 might also be damaged in welding.

In this embodiment, as illustrated in FIG. 4, the outer periphery of the bottom surface 63b of the head 63 has the chamfered portion 63d. The bearing portion 71 of the gasket 70 is compressed and deformed in a portion sandwiched between the bottom surface 63b of the head 63 and the bearing surface 41b3 of the lid 41b. Near the boundary between the bottom surface 63b and the chamfered portion 63d, the bearing portion 71 is partially pressed by the chamfered portion 63d. At an outer side (right side in the direction Y in the drawing), the bearing portion 71 and the chamfered portion 63d are separated from each other. Thus, a gap 90 is formed between the chamfered portion 63d and each of the bearing portion 71 and the side wall 72. In a portion where the gap 90 is formed, the bearing portion 71 of the gasket 70 is not compressed.

In this embodiment, since the bearing portion 71 is partially pressed by the chamfered portion 63d, the side wall 72 is tilted toward the external terminal 61. An upper portion of the side wall 72 is in contact with the side peripheral surface 63c of the head 63 of the external terminal 61, and the gap 90 is closed. The present disclosure, however, is not limited to this embodiment, and the side wall 72 may not be in contact with the side peripheral surface 63c of the head 63 and may be separated from the side peripheral surface 63c.

The "chamfered portion" herein refers to a portion with a shape in which a side peripheral surface and a bottom surface of the head of the external terminal are chamfered to such a degree that a gap is formed between the chamfered portion and each of the bearing portion and the side wall. The shape, size, and position, for example, of the chamfered portion are not specifically limited. In this embodiment, the chamfered portion 63d has a C-face shape with an angle of 45 degrees. The angle of the chamfered portion 63d with the C-face shape is not limited to a specific angle, and may be, for example, 30 degrees or more and may be 40 degrees or more. The angle of the chamfered portion 63d with the C-face shape may be, for example, 60 degrees or less and may be 50 degrees or less. In the embodiment described above, the upper end of the chamfered portion 63d is located at a position at which the thickness from the bottom surface 63b of the head 63 is about 50%. The present teaching, however, is not to this embodiment. The upper end of the chamfered portion 63d may be located above a position at which the thickness from the bottom surface 63b of the head 63 is 20% or may be located above a position at which the thickness is 40%, for example. The upper end of the chamfered portion 63d may be located below a position at which the thickness from the bottom surface 63b of the head 63 is 80% or may be located below a position at which the thickness is 60%.

Figure 6A:
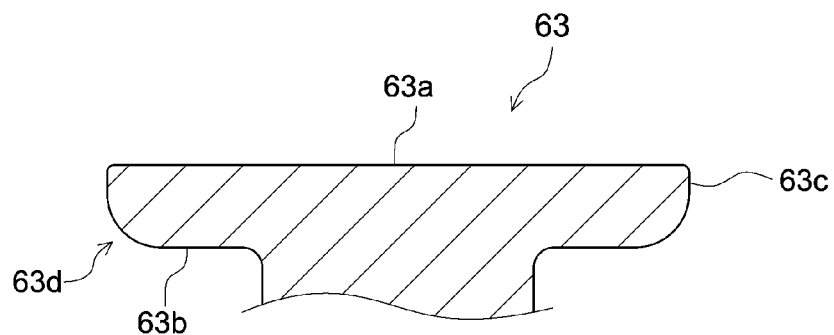
FIG. 6A is a cross-sectional view schematically illustrating a shape of a head 63 according to another embodiment.
Figure 6B:
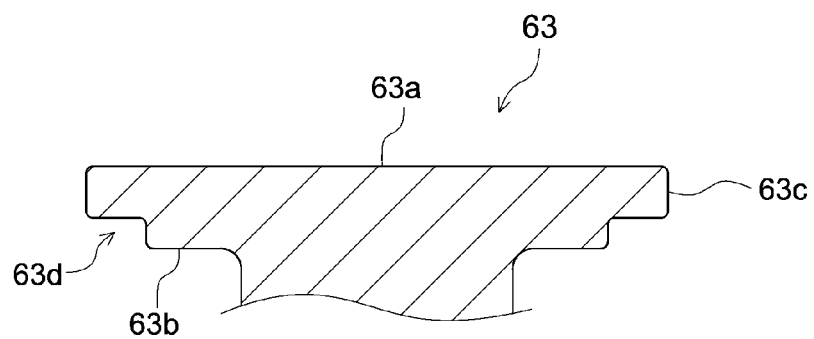
FIG. 6B is a cross-sectional view schematically illustrating a shape of a head 63 according to another embodiment.

The shape of the chamfered portion 63d is not limited to the C-face shape. FIGS. 6A and 6B are cross-sectional views schematically illustrating shapes of the head 63 according to other embodiments. The shape of the chamfered portion 63d may be, for example, an R face with a rounded corner (see FIG. 6A). The shape of the chamfered portion 63d may be a rectangular-grooved face in which a corner portion is cut out in a substantially rectangular shape in cross section (see FIG. 6B). The shape of the chamfered portion 63d may be a combination of these shapes. The chamfered portion 63d may be, but is not limited to, formed by a known machining process such as cutting or forging.

From the viewpoint of reducing a load caused by contact of the boundary between the chamfered portion 63d and the bottom surface 63b with the gasket 70 and contact of the boundary between the chamfered portion 63d and the side peripheral surface 63c with the gasket 70, the chamfered portion 63d preferably has a C-face shape or an R-face shape.

In the embodiment described above, the gasket 70 includes the bearing portion 71 and the side wall 72 rising upward from the bearing portion 71. The head 63 of the external terminal 61 has the chamfered portion 63d at the outer periphery of the bottom surface 63b. The gap 90 is formed between the chamfered portion 63d and each of the bearing portion 71 and the side wall 72. With this configuration, in portions where the gap 90 is formed, deformation of the gasket 70 by compression of a part of the bearing portion 71 is reduced. For example, deformation of the gasket 70 in which the side wall 72 of the gasket 70 is tilted outward (e.g., to the right in the direction Y in FIG. 4) is suppressed. The chamfered portion 63d with a structure for forming the gap 90 that reduces deformation of the gasket 70 is provided at the bottom surface 63b. Thus, it is possible to suppress outward deformation of the gasket 70 while obtaining a sufficient area of the upper surface 63a of the head 63 that is a surface to be welded to an external connection member such as a bus bar. In addition, the gap 90 stabilizes dimensional accuracy even when the bearing portion 71 of the gasket 70 is strongly compressed so that outward deformation of the gasket 70 can be suppressed. In this manner, deformation of the gasket 70 is suppressed so that laser light and reflected light in welding the lid 41b to the case body 41a during fabrication are less likely to strike the gasket 70, for example. Consequently, the gasket 70 is less likely to be damaged.

In the embodiment described above, the gasket 70 has a portion in which the thickness of the bearing portion 71 is compressed at a compressibility of 50% or more on a surface of the gasket 70 in contact with the bottom surface 63b of the head 63. The portion compressed with such a compressibility enables hermeticity of the battery case 41 to be easily maintained. In addition, the gap 90 can suppress deformation of the gasket 70 even with a high compressibility.

In the embodiment described above, the chamfered portion 63d is continuous in the circumferential direction of the head 63. Accordingly, the gap 90 is continuous in the circumferential direction of the head 63. With this configuration, dimensional accuracy is enhanced along the entire circumference of the head 63. In addition, deformation of the gasket 70 is suppressed along the entire circumference of the head 63.

The chamfered portion 63d does not need to be continuous in the circumferentially along the outer surface of the bottom surface 63b, and only needs to be provided at at least a portion of the outer periphery of the bottom surface 63b. The chamfered portion 63d is preferably disposed in a portion of the head 63 of the external terminal 61 close to the peripheral portion 41b1 of the lid 41b to be welded by laser welding. For example, in a case where the lid 41b is rectangular, the chamfered portion 63d is preferably provided along the long-side direction X of the lid 41b. This configuration can further increase the width of the upper surface 63a of the head 63. Accordingly, it is possible to increase the area of a portion to be connected to the bus bar while suppressing deformation of the gasket 70.

The side wall 72 of the gasket 70 may have a portion at a distance of 1.8 mm or less from the peripheral portion 41b1 of the lid 41b, for example. Even in such a case where the gasket 70 is close to the peripheral portion 41b1 of the lid 41b, the gasket 70 is less likely to be damaged in a portion of the head 63 provided with the chamfered portion 63d.

The secondary battery disclosed here has been described in details. The embodiments of the secondary battery described here, for example, are not intended to limit the present disclosure unless otherwise specified. The battery disclosed here can be modified in various ways, and the constituent elements and the processes described here can be appropriately omitted or appropriately combined unless no particular problems arise.

What is claimed is:

1. A secondary battery comprising:
   an electrode body;
   a battery case including a case body having an opening, and a lid configured to close the opening of the case body;
   an external terminal electrically connected to the electrode body and exposed at an outer side of the battery case; and
   a gasket configured to insulate the lid and the external terminal from each other at the outer side of the battery case, wherein
   the lid has an attachment hole to which the external terminal is attached,
   the external terminal includes a shaft inserted in the attachment hole and a head disposed at the outer side of the battery case and extending radially outward from one end of the shaft,
   the gasket includes a bearing portion and a side wall, the bearing portion being disposed between a bottom surface of the head and the lid, the side wall rising upward from the bearing portion,
   the head of the external terminal has a chamfered portion in which at least a part of an outer periphery of the bottom surface, and
   a gap is formed between the chamfered portion and each of the bearing portion and the side wall, and the gasket has a portion in which a thickness of the bearing portion is compressed at a compressibility of 50% or more on a surface of the gasket in contact with the bottom surface of the head.

2. The secondary battery according to claim 1, wherein the chamfered portion has a C-face shape or an R-face shape.

3. The secondary battery according to claim 1, wherein the chamfered portion is continuous in a circumferential direction of the head.

4. The secondary battery according to claim 1, wherein
   the lid is rectangular, and
   the chamfered portion is disposed along a long-side direction of the lid.

5. A secondary battery comprising:
   an electrode body;
   a battery case including a case body having an opening, and a lid configured to close the opening of the case body;
   an external terminal electrically connected to the electrode body and exposed at an outer side of the battery case; and
   a gasket configured to insulate the lid and the external terminal from each other at the outer side of the battery case, wherein
   the lid has an attachment hole to which the external terminal is attached,
   the external terminal includes a shaft inserted in the attachment hole and a head disposed at the outer side of the battery case and extending radially outward from one end of the shaft,
   the gasket includes a bearing portion and a side wall, the bearing portion being disposed between a bottom surface of the head and the lid, the side wall rising upward from the bearing portion,
   the head of the external terminal has a chamfered portion in which at least a part of an outer periphery of the bottom surface,
   a gap is formed between the chamfered portion and each of the bearing portion and the side wall, the lid is rectangular, and
   the side wall of the gasket has a portion at a distance of 1.8 mm or less from a peripheral portion of the lid.

* * * * *